(12) United States Patent
Marsh et al.

(10) Patent No.: US 6,909,366 B1
(45) Date of Patent: Jun. 21, 2005

(54) MULTI-DIMENSIONAL ELECTRONIC IDENTIFICATION OF ARTICLES

(75) Inventors: Michael John Camille Marsh, Johannesburg (ZA); Trevor Meredith Hodson, Randburg (ZA)

(73) Assignee: Trolley Scan (Proprietary) Limited, Johannesburg (ZA)

( * ) Notice: Subject to any disclaimer, the term of this patent is extended or adjusted under 35 U.S.C. 154(b) by 0 days.

(21) Appl. No.: 09/623,297

(22) PCT Filed: Mar. 3, 1999

(86) PCT No.: PCT/GB99/00635

§ 371 (c)(1),
(2), (4) Date: Nov. 7, 2000

(87) PCT Pub. No.: WO99/45494

PCT Pub. Date: Sep. 10, 1999

(30) Foreign Application Priority Data

Mar. 4, 1998 (ZA) .............................................. 98/1822

(51) Int. Cl.⁷ .............................................. G08B 26/00
(52) U.S. Cl. ............... 340/505; 340/539.1; 340/539.11; 340/572.1; 340/10.1; 340/10.2; 342/42
(58) Field of Search .............................. 340/505, 539.1, 340/539.11, 539.13, 539.32, 572.1, 10.1, 10.2; 342/42

(56) References Cited

U.S. PATENT DOCUMENTS

| | | |
|---|---|---|
| 5,124,699 A | 6/1992 | Tervoert et al. |
| 5,519,381 A | 5/1996 | Marsh et al. |
| 5,557,280 A | 9/1996 | Marsh et al. |
| 5,699,066 A | 12/1997 | Marsh et al. |
| 5,751,570 A | 5/1998 | Stobbe et al. |
| 5,850,181 A | 12/1998 | Heinrich et al. |
| 6,198,381 B1 * | 3/2001 | Turner et al. ............... 340/10.1 |
| 6,236,911 B1 * | 5/2001 | Kruger ........................... 701/1 |
| 6,433,671 B1 * | 8/2002 | Nysen ..................... 340/10.41 |
| 6,531,957 B1 * | 3/2003 | Nysen ........................ 340/10.1 |
| 6,580,358 B1 * | 6/2003 | Nysen ..................... 340/10.41 |

FOREIGN PATENT DOCUMENTS

EP 0 702 323 A2 8/1995

* cited by examiner

*Primary Examiner*—Daryl Pope
(74) *Attorney, Agent, or Firm*—Scully, Scott, Murphy & Presser

(57) ABSTRACT

An identification system is provided for identifying a plurality of randomly aligned object-based transponders (18, 20, 22) passing through a predetermined reading volume. A reader (10) includes multiple transmitting and receiving antenna arrays (12, 14, 16) which are arranged sequentially to transmit interrogating and energizing fields (29) into the reading volume, with each energizing field having a different polarisation. Each transponder (12, 14, 16) is arranged to be powered by at least one of the interrogating and energizing fields, and includes a short term memory module (30) which is arranged to record the successful transmission or otherwise of the identification signal of the transponder (20) and to retain the record in the absence of a power supply to the transponder. The short term memory module has a retention time longer than any predicted interruption of power supply to the transponder via one of the energizing fields within the reading volume. The minimum memory retention time is typically the time period taken for the sequential transmission of all but one of the interrogating and energizing fields (29) during an interrogation cycle.

18 Claims, 4 Drawing Sheets

MULTI-DIMENSIONAL ELECTRONIC IDENTIFICATION OF ARTICLES

BACKGROUND OF THE INVENTION

THIS invention relates to the multi-dimensional electronic identification of articles.

In radio frequency identification systems, a reader is typically used to read the identity of a number of objects in the form of transponders which are attached to goods to be identified, and to communicate the identification information to displays or computer networks. Communication between the reader and the transponders is by electromagnetic means, allowing transponders to be identified that are not in line of sight with the reader. Invariably, the transponders are randomly oriented, with the result that a single reader with a single energy polarisation is not capable of detecting all of the transponders. Nulls or dead zones also occur in the radiation pattern of a single reader due to interference patterns from reflecting surfaces and the like.

The problems associated with differences in polarisation and nulls or dead zones generally arise in the case of passive transponder systems, where the transponders are powered by an energising field, typically for the time period that such energising field exists. This is even more prevalent in the case of systems where transponders are effectively deactivated once they have been successfully identified, so as not to interfere with the transmissions of other transponders in the reading volume. Transponder systems of this type are described in U.S. Pat. No. 5,751,570 to Stobbe et al, U.S. Pat. No. 5,124,699 to Tervoet et al. and South African patent 93/6267 to Marsh et al.

In U.S. Pat. No. 5,519,381 to Marsh et al, a system is described that simultaneously uses at least two different interrogation signals at different frequencies to provide power to transponders in an interrogation volume. The different frequencies may be radiated from different angles, thereby compensating for dead spots and polarisation. U.S. Pat. No. 5,850,181 to Heinrich et al describes a system providing power transferred to a number of transponders by pulsing the electromagnetic field at randomly selected frequencies. The electromagnetic field is briefly turned off between frequency changes to limit spectral noise caused by the switching process. The transponders make use of an energy store to maintain the level of the operating voltage of the transponders whilst the frequency is switched between pulses.

In order to provide for low production costs, the electronic components of transponders need to be built into a single integrated circuit. As a result, the transponders have limited on-board energy storage capacity in situations where the energising field has been removed. In the absence of an on-board power supply in the form of a storage capacitor, such transponders are volatile, in that they tend to perform a power on reset when the energising field is re-established at the start of the next reading session, even when this occurs relatively soon after a prior reading session. This can lead to a single transponder being read several times in error in the case of multiple interrogation fields being utilized.

SUMMARY OF THE INVENTION

According to a first aspect of the invention there is provided an identification system comprising at least one reader defining a predetermined reading zone and a plurality of objects, wherein:

the reader includes first transmission means for transmitting a first interrogating and energising field into the reading zone and receiver means arranged to receive and identify an identification signal from at least one object; and, each object is arranged to be powered by the energising field and includes memory means, and transmission means arranged to transmit an identification signal to the reader identifying itself, the memory means being arranged to record the successful transmission or otherwise of the identification signal and to retain the record in the absence of a power supply to the object, for a time period longer than any predicted interruption of power supply to the object via the energising field within the reading zone.

In a preferred form of the invention, the reader includes second transmission means for transmitting a second interrogating and energising field from the reader, and cycling means for sequentially transmitting the first and second interrogating fields during an interrogation cycle wherein the predicted interruption of power supply corresponds to the maximum possible time period for which the object may not be powered during the interrogation cycle.

Conveniently, the reader includes at least three transmission means arranged to transmit at least three corresponding interrogating and energising fields into a predetermined volume within which the objects are to be identified, using sufficient different axes of polarisation and/or reader locations practically to cover all possible orientations and locations of objects within the volume, with the time period of the interrogation cycle including the time period taken for the sequential transmission of all but one of the interrogating and energising fields.

Typically, the objects are passive transponders which are only powered for the time period that they receive an interrogating and energising field.

Advantageously, the transmission means comprises a plurality of oriented and polarised transmitting antennas and at least one transmitter connected to the transmitting antennas for sequentially energising the transmitting antennas with a carrier wave signal of a predetermined frequency, and the receiver means includes a plurality of similarly oriented and polarised matching receiving antennas and at least one receiver connected to the receiving antennas for receipt of the identification signals from the objects, the reader further comprising processor means for processing and decoding the incoming identification signals.

The cycling means conveniently comprises first switching means for sequentially switching the transmitter between the transmitting antennas, second switching means for sequentially switching the receiver between the receiving antennas, and a switch control unit for operating the first and second switching means in concert whereby, at any one moment, matching transmitting and receiving antennas are operative to transmit and receive similarly polarised signals.

The invention extends to a method of identification of a plurality of objects by a reader comprising the steps of:

transmitting. during an interrogation cycle, a first interrogating and energising field from the reader for powering and interrogating the objects;

transmitting an identification signal from at least one object in response to the first interrogation field;

receiving the identification signal at the reader, and determining if the signal has been correctly received;

recording at the object the successful transmission or otherwise of its identification signal and retaining the record in the absence of a power supply to the object for a time period longer than any predicted interruption of power supply to the object.

Preferably, the method comprises the steps of initiating the interrogating and energising cycle by transmitting the first interrogating and energising field from the reader and transmitting a second interrogating and energising field from the reader, with the time period of the predicted interruption of power supply corresponding to the maximum possible time period for which the object may not be powered by any interrogation field during the interrogation cycle.

Advantageously, multiple interrogation fields are transmitted into a predetermined volume within which objects are to be identified, using sufficient different axes of polarisation and/or reader locations practically to cover all possible orientations and locations of objects within the volume, with the maximum possible time period including at least the time period taken for the transmission of all but one of the multiple interrogation fields.

The method typically includes the steps of using the retained record of successful transmission to prevent the subsequent transmission of the identification signal at least for the duration of the interrogation cycle, and using the retained record of unsuccessful transmission to allow the subsequent transmission of the identification signal during the interrogation cycle.

Conveniently, the interrogation fields are sequentially cycled through during the interrogating and energising cycle, each object is only powered for the time period that it is energised by an energising field, and the memory means is arranged to be recharged by subsequent interrogation fields that it receives during the interrogation cycle for as long as it retains the record of successful transmissions.

According to a still further aspect of the invention there is provided a passive transponder for an identification system of the type comprising at least one reader defining a predetermined reading zone and a plurality of object-based transponders, the transponder being arranged to be powered and interrogated during an interrogation cycle, by at least one of a plurality of energising fields from the reader, and including re-settable short term memory means, and transmission means arranged to transmit an identification signal to the reader identifying itself, the memory means being arranged to record the successful transmission or otherwise of the identification signal and to retain the record in the absence of a power supply to the object via an energising field, for a time period longer than any predicted interruption of power supply to the object within the reading zone during the interrogation cycle.

Preferably, the short term memory means is operative to record the successful transmission of the identification signal and to retain the record to prevent the subsequent transmission of the identification signal for at least the duration of the interrogation cycle.

Conveniently, the transponder includes on-board power supply means for deriving a power supply signal for powering the transponder only for the duration that it receives a powering and interrogation field.

Typically, the transponder includes a control logic circuit connected to the short term memory means, the short term memory means being responsive to a memory set signal from the control logic circuit, and the control logic means being responsive to a memory status signal from the short term memory means, the memory set signal being generated by the control logic circuit in response to the successful transmission of the identification signal, and the memory status signal being arranged to prevent the transponder, via the control logic circuit, from subsequently transmitting the identification signal for the time period.

The short term memory means may include an RC-type circuit having a predetermined time constant proportional to the time period, and comparator means having the RC-type circuit as an input and the memory status signal as an output, whereby the memory status signal is arranged to change states in the event of the signal from the RC-type circuit falling below a reference value.

Conveniently, the memory set signal is generated each time the transponder is powered up via an interrogation signal during an interrogation cycle to prevent the transmission of the identification signal at least for the time period commencing as soon as the transponder has been powered down.

Typically, the control logic circuit includes latching means responsive to the memory status signal, the latching means further being arranged to generate the memory set signals in response to the successful transmission of the identification signal, and further being arranged to disable the transponder output for the time period that the status signal is indicative of a set short term memory status.

DESCRIPTION OF EMBODIMENTS

Figure 1:
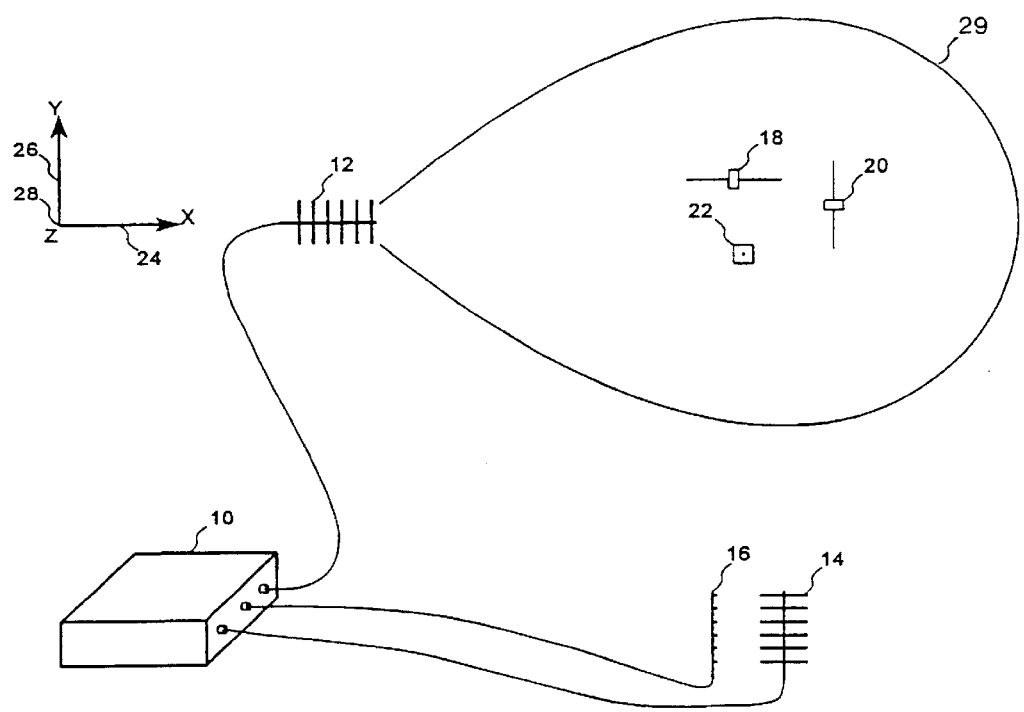
FIG. 1 shows a highly schematic diagram of a reader and three differently oriented transponders in the interrogation field of the reader.

FIG. 1 shows a reader or interrogator 10 with three Yagi antennas 12, 14 and 16. The antennas are positioned so that differently oriented transponders 18, 20 and 22 are within the effective reading range or energising field of at least one of the antennas. Antenna 12 is horizontally polarised and is aligned along the x-axis 24, antenna 14 is horizontally polarised and is aligned along the y-axis 26 and antenna 16 is vertically polarised and is aligned along the y-axis 26. The z-axis 28 extends vertically into the page. Transponder 18 lies along the x-axis 24, transponder 20 along the y-axis 26 and transponder 9 along the z-axis 28. The effective interrogator field or reading range of antenna 12 is depicted by an oval footprint 29. The effective reading range is defined as the range within which any transponder which has the correct antenna polarisation for reader antenna 12 will collect sufficient energy to power its circuitry. Thus transponder 18 will essentially receive energy from the energising field radiated by antenna 14, transponder 20 from antenna 12 and transponder 22 from antenna 16. The relative position of the antennas, the polarisation of the antennas and even the number of antennas is dependant on the specific application for which the transponders are being used. The three antennas are positioned to generate three interrogation fields which, in combination, define a predetermined three-dimensional interrogation volume through which transponders may be passed.

The reader 10 cycles the interrogation fields between each of the three antennas 12, 14 and 16. Each antenna can have its own transmitter and receiver or the reader can use an RF switch to accomplish the switching between the antennas. The frequency of the electromagnetic field is preferably the same for each antenna, although it could also be different for each antenna. The length of the reader cycle is governed by the retention time of a short term memory element in each of the transponders.

Figure 2:
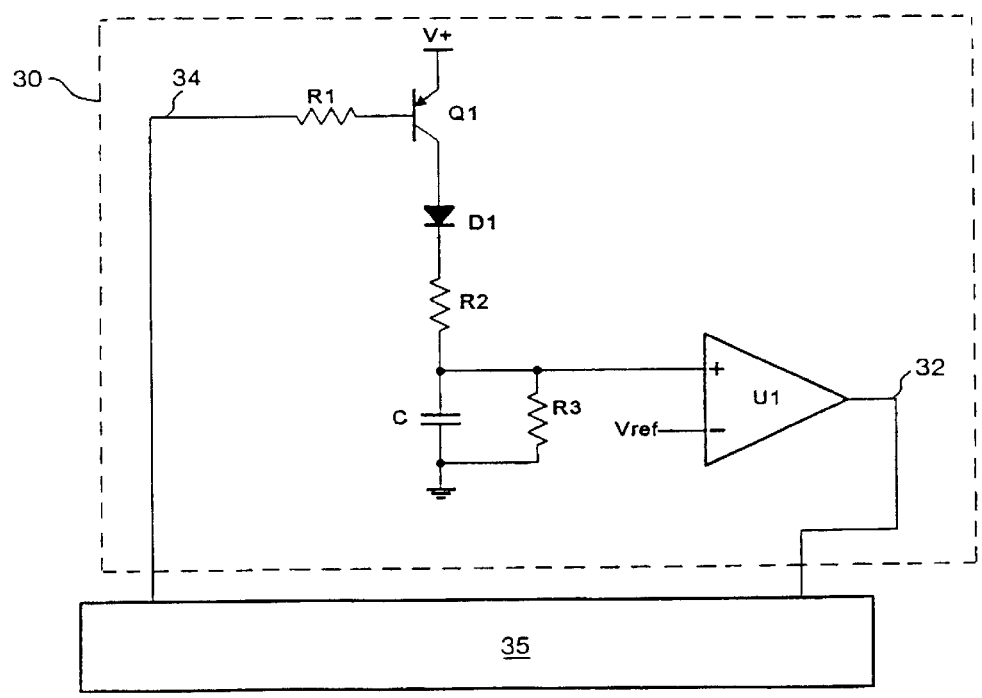
FIG. 2 shows a circuit diagram of a short term memory element forming part of each of the transponders.

FIG. 2 shows a schematic circuit diagram of such a short term memory element 30. If the transponder has been without power for a sufficient length of time, then capacitor C has no charge stored in it. When the transponder initially powers up, the voltage stored in capacitor C is less than Vref so the output 32 of a comparator U1, which is a memory status signal, is a low. A memory set signal is initially raised on power up via an input switching control line 34. If the memory status signal is low then transponder logic 35 enables the transponder to transmit its stored data. The transponder logic 35 also holds the memory set signal high via the control line 34.

The transponder transmits its code according to its protocol. When the transponder has successfully transmitted its identification signal and/or the reader has successfully read it, the transponder is placed into a non-responsive state using the method defined by its protocol. The transponder logic 35 lowers the memory set signal which turns on transistor Q1 via resistor R1. This causes capacitor C to charge via Q1, diode D1 and resistor R2. The capacitor C charges to a voltage V+ less the volt drops across diode D1 and transistor Q1. This is higher than Vref and so the output of the comparator U1 rises. The memory status signal at the output 32 is thus raised to a high which causes the transponder logic 35 to disable any further transmissions of its stored data.

If power is removed for a short period, the transponder circuitry will stop functioning. Capacitor C will slowly be discharged by resistor R3. If power is reapplied while the voltage on capacitor C is still above Vref, then the output 32 will still be high and so the transponder logic 35 will prevent the transponder from transmitting its data. The transponder logic 35 will also lower the memory set signal at the input control line 34 so as to recharge capacitor C. If, however, power is reapplied after the voltage on capacitor C has dropped below Vref, then the memory status signal will be low and so the transponder logic 35 will enable the transponder to transmit its data again. The memory set signal is kept high so that capacitor C is not recharged.

The time constant of the capacitor C and resistor R3 is such that it will take longer than the reader cycling time to discharge to Vref, typically 2 seconds, but will have discharged below Vref within, say, 5 seconds, thus allowing the transponder to be reread. The capacitor C has a typical value of 5 pF and the resistor R3 a value of 1TΩ. It will be appreciated that any IC equivalent resistive components, such as lossy FET transistors, can be used. The reader cycling time is the time it takes the reader or interrogator 10 to cycle through a full interrogation cycle in which all three antennas 12, 14 and 16 have been sequentially activated to cover the interrogation volume through which the differently aligned transponders are being passed. The small value of the capacitor C means that it occupies a relatively small area, and the entire short term memory element can thus be integrated into a single integrated circuit along with the rest of the transponder circuitry.

Figure 3:
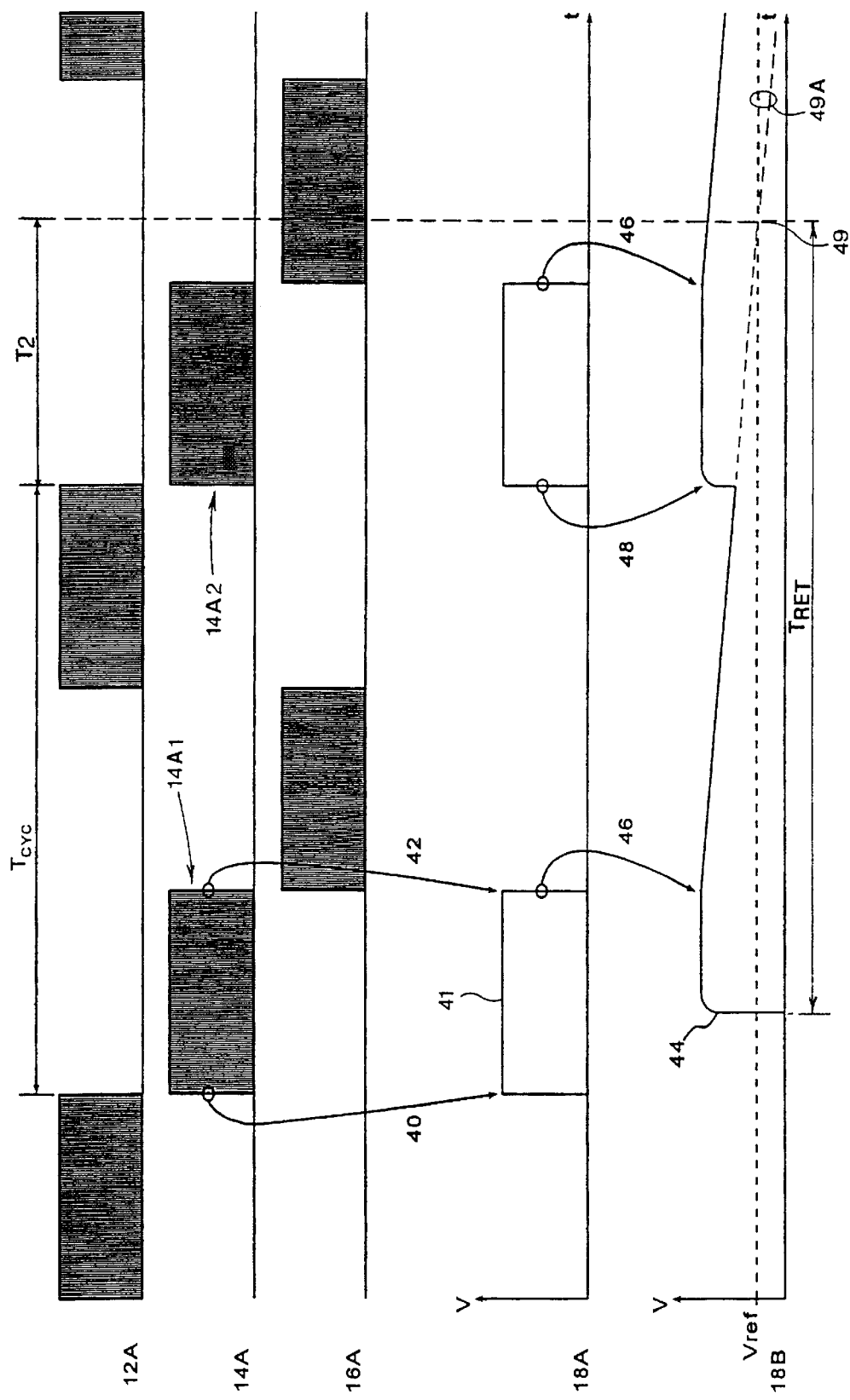
FIG. 3 shows a series of signal waveforms indicating a number of interrogation cycles and a typical response from a short term memory element in one of the transponders.

FIG. 3 shows signal waveforms of the cycling of the reader energising or interrogating fields. Waveform 12A show the energising field for antenna 12, waveform 14A shows the energising field for antenna 14 and waveform 16A shows the energising field for antenna 16. The energising field is first switched on for antenna 12. After time $T_{cyc}/3$, antenna 12 is turned off and antenna 14 is switched on, and after time $2T_{cyc}/3$, antenna 14 is turned off and antenna 16 is turned on, after which the cycle recommences with antenna 12. The time for the reader to cycle through all the antennas is give by $T_{cyc}$. Waveform 18A shows the operating voltage for transponder 18 which is positioned so as primarily to receive energy from the energising field of antenna 14. At 40, when the energising field 14A1 of antenna 14 is turned on, then the antenna on transponder 18 collects energy from the energising field, rectifies and smoothes the energising field and produces an operating voltage 41 for the transponder. At 42, when the energising field on antenna 14 is turned off, then the operating voltage 41 on transponder 18 immediately drops to zero.

Waveform 18B shows the voltage on capacitor C for transponder 18. Transponder 18 is initially in a responsive state and is able to transmit its data to the reader since capacitor C is uncharged. At 44, transponder 18 has been successfully read by the reader and is placed into a non-responsive state. Capacitor C is charged and so the transponder is unable to transmit any further data to the reader. At 46, when the operating voltage drops to zero, then the capacitor C starts to discharge at a rate determined by the R3C time constant. Once the reader has cycled through the other two antennas 16 and 12, the power is restored to transponder 18 via waveform 14A2. The voltage on C is still higher than Vref and so the capacitor C is recharged at 48 as the operating voltage rises, and the transponder thus remains in a non-responsive state. If the energising field was removed for a longer period than $T_{cyc}$, then the capacitor C would discharge further until its voltage dropped below Vref, as is shown in broken outline at 49, at time $T_{cyc}+T2$. The transponder would then be able to transmit its data again when the energising field is reapplied, and Vref would be higher than the R3C output voltage, as is shown at 49A. $T_{cyc}$, or the reader's cycle time, is typically 3 seconds, with each interrogation pulse having a duration of 1 second.

In the drawing, $T_{ret}$ is the memory retention time of the responder. This commences at 46, when the first energising field of antenna 14 is turned off and the operating voltage 41 on the transponder 18 drops to zero, and continues up until point 49 on the time axis. In the particular example, $T_{ret}=\frac{2}{3}T_{cyc}+T2$. More generally, in the case of N interrogation fields being transmitted sequentially from N different antennas, with each non-overlapping interrogation field lasting for an identical time period T, then $T_{cyc}=nT$, and the minimum theoretical retention time $T_{ret}=T(n-1)$. In the case of non-equal time periods, then the minimum theoretical retention time would equal the total cycle time less the minimum transmission time for the interrogation field having the shorter duration. In order to allow for variations in component values, temperature changes and the like, the time constant of the short term memory is calculated so that an additional time period, such as time $T_2$, is added to the theoretical minimum memory retention time. In even more general terms, the minimum permissible retention time is at least the maximum possible time period for which the transponder may not be powered by any interrogation field within the interrogation cycle as the transponder passes through the reading zone. In the particular embodiment, the time to discharge capacitor C sufficiently to allow the deactivated transponders to transmit again is typically in the region of 3.5 to 5 seconds.

The above reader arrangement with three antennas is ideally suited to applications such as reading the contents of a supermarket trolley. In a supermarket trolley, each product that has been purchased incorporates a transponder. At the check-out counter, the trolley is wheeled through an interrogation volume defined by three or more antennas positioned to generate three or more interrogation fields in the manner illustrated in FIG. 1. Typically, the three fields are mutually orthogonal. Randomly aligned transponders in the trolley, whilst generally not being individually aligned with either the x-, y- or z-axes, will invariably have an alignment which is most suited to receiving one of the polarised signals. More particularly, the alignment axis of each antenna can be broken down into x, y and z vectors, with the predominant vector determining the particular polarised interrogation signal that will predominantly be received by the transponder. In many cases, in particular where a transponder is close to two or more interrogation fields, or has a diagonal orientation which causes it to respond to two or more interrogation fields, that transponder may be read twice during an interrogation cycle, in the absence of the short term memory element 30. The short term memory element 30 thus ensures that a transponder is read only once during a particular cycle, even if it is energised and de-energised by different interrogating fields during that particular cycle.

Figure 4:
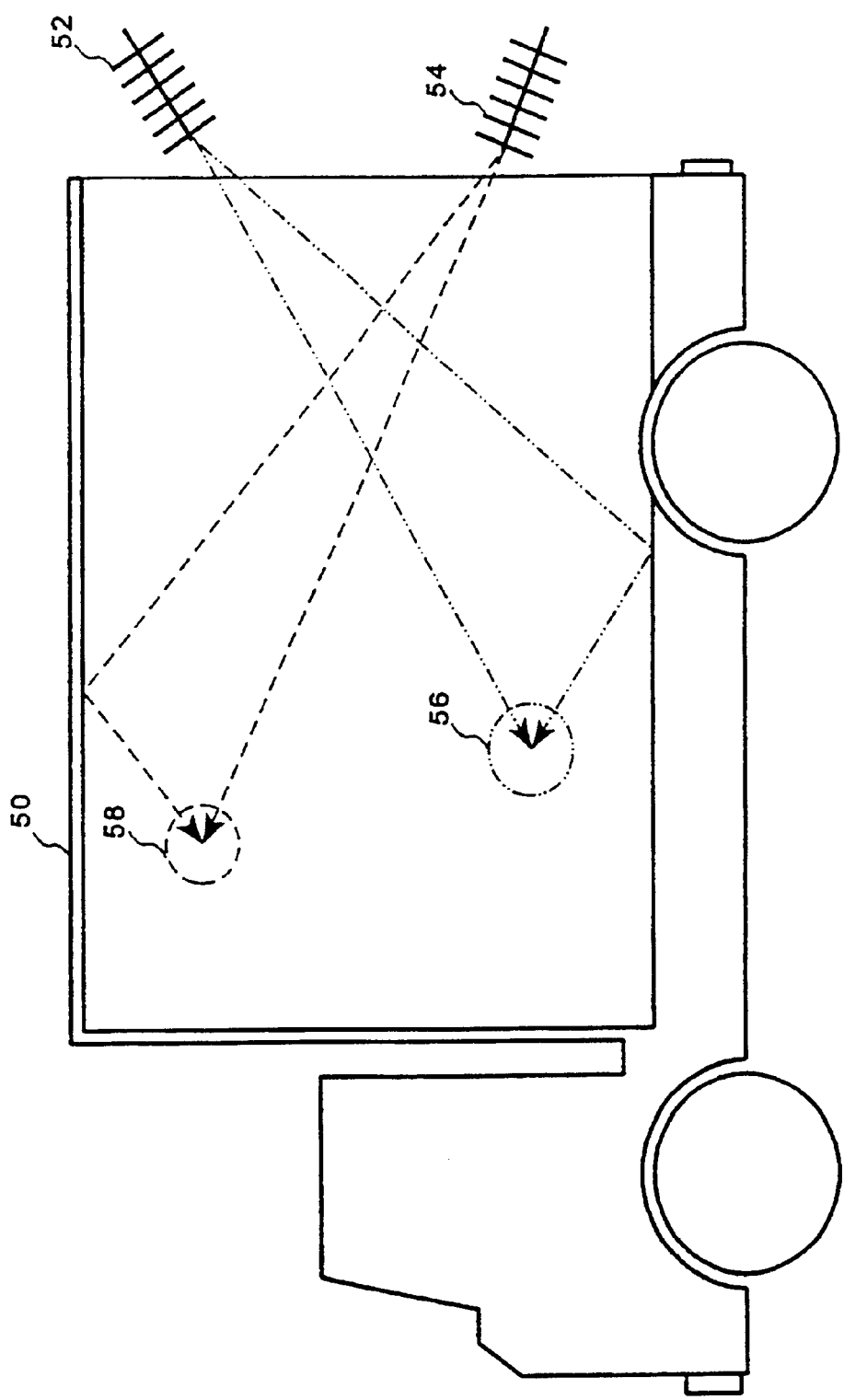
FIG. 4 shows a schematic diagram of the manner in which scanning of the interior of a truck using the method of the invention avoids nulls.

In an application such as the scanning of the interior of a metal boxed truck 50, as shown in FIG. 4, the metal wall would cause reflected energising signals to interfere with the direct energising signals, resulting in zones of low energy within the truck 50. Antennas 52 and 54 have low energy zones 56 and 58 respectively. These zones are dependent on the position of the antennas, and will be different for differently positioned antennas. By switching between different antenna pairs during the reading, the reader can ensure that the entire contents of the truck are adequately illuminated with energising field, as long as the time taken to complete a reading cycle is less than the memory retention time of the short term memory element. The system can also be used to read items occupying a large volume, the dimensions of which are larger than the range of an individual reader, by allowing the placing of the reader antennas around the outside of the volume, which the reader scanning from all the antennas within a reading cycle.

The antennas surrounding the volume may be scanned around the volume, and may also be rotated or shifted along any predetermined path effectively to cover randomly oriented transponders within the volume. In an extreme example, a single transmit/receive antenna or a transmit/receive antenna pair may be scanned around the volume, or vice versa.

Figure 5:
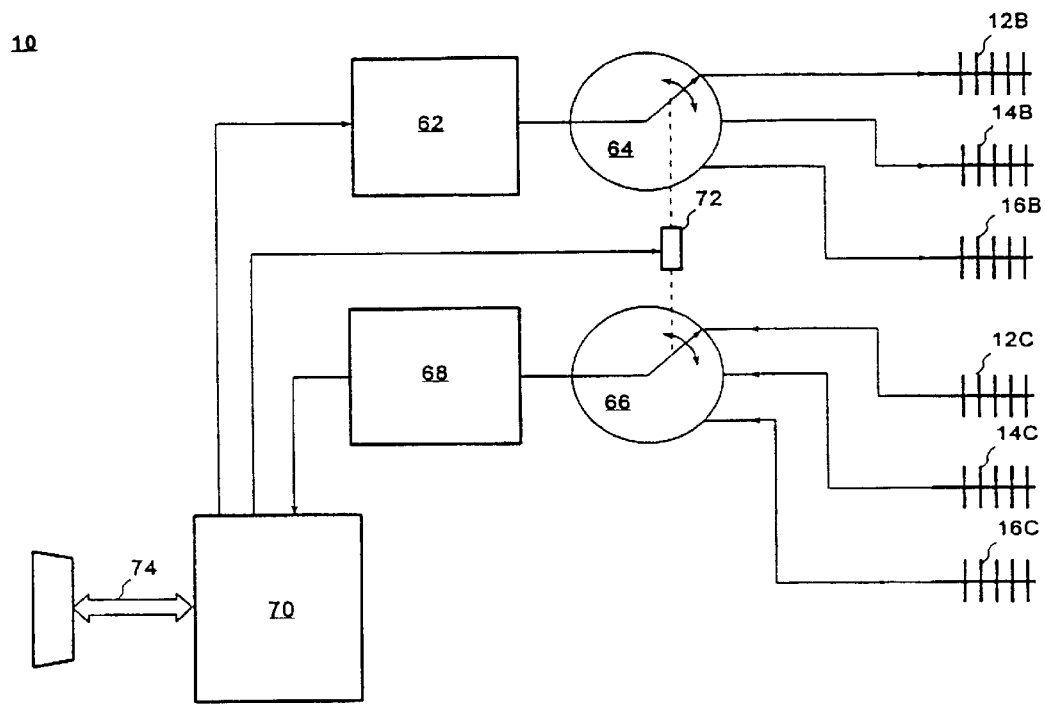
FIG. 5 shows a schematic block diagram of a reader of the invention.

Referring now to FIG. 5, a block diagram of a typical reader or interrogator 10 is shown. The transmitting antenna 12B and the receiving antenna 12C are in the same orientation and polarisation, as are transmitting antennas 14B and 16B and respective receiving antennas 14C and 16C. A transmitter 62 provides a carrier wave signal at a typical operating frequency of 915 MHz. The output of the transmitter 62 is switched by a transmitter switch 64 between transmit antennas 12B, 14B and 16B. The antenna that the switch is set to radiates the carrier wave signal as an electromagnetic interrogation or energising field, which is used to power one or more of the transponders 18, 20 and 22, depending on the orientation of the transponders relative to the antennas. The transponders communicate by means of backscatter modulation which is received by one of the corresponding receive antennas 12C, 14C or 16C, depending on which antenna is busy radiating. A receive switch 66 switches the received signals from the receive antennas to a receiver 68. The receiver then sends the received signals to a processor 70, which decodes the incoming data. A switch control unit 72 is controlled by the processor 70, and is arranged so that it controls both the transmit switch 64 and the receive switch 66 in concert. Thus, if the transmit switch 64 is set to transmit via the transmit antenna 12B, then the receive switch 66 will simultaneously be set so that the corresponding receive antenna 12C is connected to the receiver. The decoded data is sent by the processor 70 to a computer 75 via a communication link 74.

Figure 6:
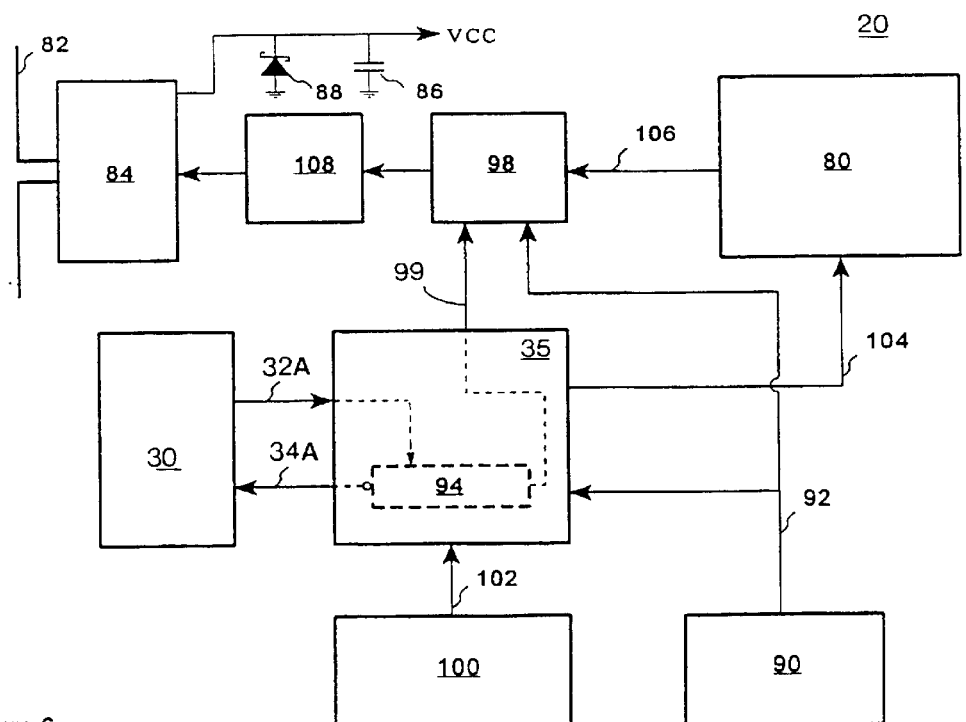
FIG. 6 shows a schematic block diagram of a transponder of the invention.

In FIG. 6, a schematic block diagram of a typical transponder 20 is shown. The transponder data or code is stored in a data memory module 80. An antenna 82 collects energy from the energising field 29. A radio frequency (RF) module 84 rectifies the collected energy and filters it using a capacitor 86 to provide a DC operating voltage for the transponder circuitry for the time that the energising field is on. The capacitor has a value of around 5 pF, which is too small to continue powering the transponder after the energising field has been removed. Overvoltage protection in the form of a zener diode 88 or a similar device limits the operating voltage when the transponder is close to the reader. An oscillator 90 provides a clock signal 92 for the transponder circuitry.

When the transponder is initially powered on, a "successfully read" latch 94 is cleared which causes a memory set signal 34A to be raised. The voltage of capacitor C in the short term memory element 30 is a zero which causes the memory status signal 32A to be low, so the "successfully read" latch 94 remains cleared. Since the output of the "successfully read" latch 94 is low, then the output of a Manchester encoder 98 is enabled via an enable signal 99 from the latch 94.

The pseudo random number generator 100 times a random delay time. When the delay time expires, the pseudo random number generator 100 sends a trigger signal 102 to the control logic 35 which causes the control logic to start transmitting the transponder data in the following manner. The control logic 35 sends a shift clock signal 104 to the data memory 80 which serially shifts the data 106 out of the data memory 80. The data 106 is exclusive or'ed with the clock signal 92 in the Manchester encoder 98. The output of the Manchester encoder 98 drives the modulator 108. The modulator 108 varies the loading on the antenna and so modulates the backscatter from the antenna with Manchester encoded transponder data. When all the transponder data has been transmitted, the control logic 35 stops the shift clock 104.

If the reader 10 is able to successfully receive and decode the transponder identification data, then it communicates to the transponder by means of a protocol that it has been successfully read. Alternatively, successful transmission of the transponder identification signal may be "signalled" by the absence of an "interrupt" signal from the reader. Successful transmission and receipt of the identification signal causes the "successfully read" latch 94 to be set. The setting of the "successfully read" latch 94 causes the memory set signal 34A to be lowered, which charges the capacitor C. The output of the "successfully read" latch 94 is raised which disables the output of the Manchester encoder which in turn prevents the transponder from transmitting its data again.

If the energising field is removed for a short period and then reapplied, then the state of the "successfully read" latch 94 is lost. However, the capacitor C in the short term memory element 30 is still charged. When the power is reapplied, the charge on the capacitor C causes the memory status signal 32A to be raised, which in turn causes the "successfully read" latch 94 to be set. The output of the "successfully read" latch 94 is then raised which disables the output of the Manchester encoder and in turn prevents the transponder from transmitting its data. The memory set signal 34A is also lowered, which causes the capacitor C to be recharged. In this manner the power to a transponder can be removed for a short period and the transponder will "remember" that it has been successfully read.

One of the main advantages of the invention is that it retains the dimensional advantages of a passive transponder which derives all its energy from its energising field, and is only powered for the period that it is energised by the field. As a result, the capacitor 86 may be reduced to a size in which it merely performs a smoothing function to provide a DC voltage for the time period that the transponder is energised. The memory requirements of the short term memory are minimised, to the extent that it merely needs to remember if it has successfully been read or not for the duration of an interrogation cycle, during which time the short term memory is able effectively to prevent the transponder from responding to a power on reset signal associated with transponders of this type.

What is claimed is:

1. An identification system comprising at least one reader defining a predetermined reading zone and a plurality of objects, wherein:

the reader includes first transmission means for transmitting a first interrogating and energising field into the reading zone and receiver means arranged to receive and identify an identification signal from at least one object; and, each object is arranged to be powered by the energising field and includes memory means, and transmission means arranged to transmit an identification signal to the reader identifying itself, the memory means being arranged to record the successful transmission or otherwise of the identification signal and to retain the record in the absence of a power supply to the object, for a time period longer than any predicted interruption of power supply to the object via the energising field within the reading zone.

2. An identification system according to claim 1 in which the reader includes second transmission means for transmitting a second interrogating and energising field from the reader, and cycling means for sequentially transmitting the first and second interrogating fields during an interrogation cycle wherein the predicted interruption of power supply corresponds to the maximum possible time period for which the object may not be powered during the interrogation cycle.

3. An identification system according to claim 2 in which the reader includes at least three transmission means arranged to transmit at least three corresponding interrogating and energising fields into a predetermined volume within which the objects are to be identified, using sufficient different axes of polarisation and/or reader locations practically to cover all possible orientations and locations of objects within the volume, with the time period of the interrogation cycle including the time period taken for the sequential transmission of all but one of the interrogating and energising fields.

4. An identification system according to either one of the preceding claim 2 or 3 in which the objects are passive transponders which are only powered for the time period that they receive an interrogating and energising field.

5. An identification system according to claim 2 in which the transmission means comprises a plurality of oriented and polarised transmitting antennas and at least one transmitter connected to the transmitting antennas for sequentially energising the transmitting antennas with a carrier wave signal of a predetermined frequency, and the receiver means includes a plurality of similarly oriented and polarised matching receiving antennas and at least one receiver connected to the receiving antennas for receipt of the identification signals from the objects, the reader further comprising processor means for processing and decoding the incoming identification signals.

6. An identification system according to claim 5 in which the cycling means comprises first switching means for sequentially switching the transmitter between the transmitting antennas, second switching means for sequentially switching the receiver between the receiving antennas, and a switch control unit for operating the first and second switching means in concert whereby, at any one moment, matching transmitting and receiving antennas are operative to transmit and receive similarly polarised signals.

7. A method of identifying a plurality of objects by a reader comprising the steps of:

transmitting, during an interrogation cycle, a first interrogating and energising field from the reader for powering and interrogating the objects;

transmitting an identification signal from at least one object in response to the first interrogation field;

receiving the identification signal at the reader, and determining if the signal has been correctly received;

recording at the object the successful transmission or otherwise of its identification signal and retaining the record in the absence of a power supply to the object for a time period longer than any predicted interruption of power supply to the object.

8. A method according to claim 7 which comprises the steps of initiating the interrogating and energising cycle by transmitting the first interrogating and energising field from the reader and transmitting a second interrogating and energising field from the reader, with the time period of the predicted interruption of power supply corresponding to the maximum possible time period for which the object may not be powered by any interrogation field during the interrogation cycle.

9. A method according to claim 8 in which multiple interrogation fields are transmitted into a predetermined volume within which objects are to be identified, using sufficient different axes of polarisation and/or reader locations practically to cover all possible orientations and locations of objects within the volume, with the maximum possible time period including at least the time period taken for the transmission of all but one of the multiple interrogation fields.

10. A method according to claim 7 which includes the steps of using the retained record of successful transmission to prevent the subsequent transmission of the identification signal at least for the duration of the interrogation cycle, and using the retained record of unsuccessful transmission to allow the subsequent transmission of the identification signal during the interrogation cycle.

11. A method according to claim 10 in which the interrogation fields are sequentially cycled through during the interrogating and energising cycle, each object is only powered for the time period that it is energised by an energising field, and the memory means is arranged to be recharged by subsequent interrogation fields that it receives during the interrogation cycle for as long as it retains the record of successful transmissions.

12. A passive transponder for an identification system of the type comprising at least one reader defining a predetermined reading zone and a plurality of object-based transponders, the transponder being arranged to be powered and interrogated during an interrogation cycle, by at least one of a plurality of energising fields from the reader, and including re-settable short term memory means, and transmission means arranged to transmit an identification signal to the reader identifying itself, the memory means being arranged to record the successful transmission or otherwise of the identification signal and to retain the record in the absence of a power supply to the object via an energising field, for a time period longer than any predicted interruption of power supply to the object within the reading zone during the interrogation cycle.

13. A transponder according to claim 12 in which the short term memory means is operative to record the successful transmission of the identification signal and to retain the record to prevent the subsequent transmission of the identification signal for at least the duration of the interrogation cycle.

14. A transponder according to claim 12 which includes on-board power supply means for deriving a power supply signal for powering the transponder only for the duration that it receives a powering and interrogation field.

15. A transponder according to claim 14 which includes a control logic circuit connected to the short term memory means, the short term memory means being responsive to a memory set signal from the control logic circuit, and the control logic means being responsive to a memory status signal from the short term memory means, the memory set signal being generated by the control logic circuit in response to the successful transmission of the identification signal, and the memory status signal being arranged to prevent the transponder, via the control logic circuit, from subsequently transmitting the identification signal for the time period.

16. A transponder according to claim 15 in which the short term memory means includes an RC-type circuit having a predetermined time constant proportional to the time period, and comparator means having the RC-type circuit as an input and the memory status signal as an output, whereby the memory status signal is arranged to change states in the event of the signal from the RC-type circuit falling below a reference value.

17. A transponder according to claim 15 in which the memory set signal is generated each time the transponder is powered up via an interrogation signal during an interrogation cycle to prevent the transmission of the identification signal at least for the time period commencing as soon as the transponder has been powered down.

18. A transponder according to claim 17 in which the control logic circuit includes latching means responsive to the memory status signal, the latching means further being arranged to generate the memory set signals in response to the successful transmission of the identification signal, and further being arranged to disable the transponder output for the time period that the status signal is indicative of a set short term memory status.

* * * * *